(12) United States Patent
Xu

(10) Patent No.: US 12,328,511 B2
(45) Date of Patent: Jun. 10, 2025

(54) EXPOSURE CONTROL METHOD AND ELECTRONIC DEVICE

(71) Applicant: Honor Device Co., Ltd., Shenzhen (CN)

(72) Inventor: Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/260,194

(22) PCT Filed: Dec. 20, 2022

(86) PCT No.: PCT/CN2022/140441
§ 371 (c)(1),
(2) Date: Jun. 30, 2023

(87) PCT Pub. No.: WO2023/160178
PCT Pub. Date: Aug. 31, 2023

(65) Prior Publication Data
US 2024/0380980 A1    Nov. 14, 2024

(30) Foreign Application Priority Data
Feb. 28, 2022 (CN) .......................... 202210193159.4

(51) Int. Cl.
*H04N 23/73* (2023.01)
*H04N 23/68* (2023.01)
(Continued)

(52) U.S. Cl.
CPC ......... *H04N 23/73* (2023.01); *H04N 23/6811* (2023.01); *H04N 23/6812* (2023.01);
(Continued)

(58) Field of Classification Search
CPC .............. H04N 23/73; H04N 23/6811; H04N 23/6812; H04N 23/72; H04N 23/75; H04N 23/76; H04N 23/71
See application file for complete search history.

(56) References Cited

U.S. PATENT DOCUMENTS 7,239,342 B2 * 7/2007 Kingetsu ............... H04N 23/684
348/208.4
7,546,026 B2 * 6/2009 Pertsel ................. H04N 23/684
396/153
(Continued)

FOREIGN PATENT DOCUMENTS

CN       101346987 A     1/2009
CN       103888681 A     6/2014
(Continued)

*Primary Examiner* — Ahmed A Berhan
(74) *Attorney, Agent, or Firm* — Rimon PC

(57) ABSTRACT

This application relates to the photographing field, and discloses an exposure control method and an electronic device, to resolve a problem that an electronic device cannot intelligently control exposure parameters based on different scenes. A specific solution is: separately determining a depth of field parameter, a movement level parameter, and a noise intensity factor; determining exposure parameters based on the depth of field parameter, the movement level parameter, and the noise intensity factor, where the exposure parameters include an aperture value, an exposure time value, and light sensitivity of a photosensitive sensor; controlling an aperture size, a shutter speed, and light sensitivity that are of the electronic device during photographing previewing and/or photographing based on the exposure parameters.

11 Claims, 7 Drawing Sheets

(51) Int. Cl.
*H04N 23/72* (2023.01)
*H04N 23/75* (2023.01)
*H04N 23/76* (2023.01)

(52) U.S. Cl.
CPC ............. *H04N 23/72* (2023.01); *H04N 23/75* (2023.01); *H04N 23/76* (2023.01)

(56) References Cited

U.S. PATENT DOCUMENTS

| | | | |
|---|---|---|---|
| 8,150,252 B2 * | 4/2012 | Osawa | H04N 23/675 396/61 |
| 11,206,360 B2 | 12/2021 | Sun | |
| 11,729,488 B2 | 8/2023 | Ouchi | |
| 2007/0092244 A1 | 4/2007 | Pertsel et al. | |
| 2008/0101786 A1 | 5/2008 | Pozniansky et al. | |
| 2009/0256921 A1 | 10/2009 | Pertsel et al. | |
| 2017/0212408 A1 | 7/2017 | Ma et al. | |
| 2020/0221009 A1 | 7/2020 | Citerin et al. | |

FOREIGN PATENT DOCUMENTS

| | | |
|---|---|---|
| CN | 105590294 A | 5/2016 |
| CN | 106851123 A | 6/2017 |
| CN | 107343157 A | 11/2017 |
| CN | 109040609 A | 12/2018 |
| CN | 110290289 A | 9/2019 |
| CN | 111512625 A | 8/2020 |
| CN | 110121882 B | 9/2020 |
| CN | 112190271 A | 1/2021 |

\* cited by examiner

EXPOSURE CONTROL METHOD AND ELECTRONIC DEVICE

CROSS-REFERENCE TO RELATED APPLICATIONS

This application is a national stage of International Application No. PCT/CN2022/140441, filed on Dec. 20, 2022, which claims priority to Chinese Patent Application No. 202210193159.4, filed on Feb. 28, 2022, both of which are incorporated herein by references in their entireties.

TECHNICAL FIELD

This application relates to the photographing field, and in particular, to an exposure control method and an electronic device.

BACKGROUND

With development of mobile terminals such as a mobile phone and a tablet computer, a quantity of mobile terminals around people is increasing, and people more frequently use the mobile terminals.

Currently, to meet a photographing requirement of a user, many mobile terminals are provided with cameras, so that the user can use the mobile terminal for photographing conveniently and quickly. Quality of camera photographing mainly depends on whether exposure parameters used by the camera during photographing are appropriate. The exposure parameters usually include an exposure time value, an aperture value, and light sensitivity of a photosensitive sensor. Different exposure parameters have different impact on an effect of camera photographing. Therefore, when the camera is used for photographing in different scenes, the exposure parameters need to be controlled based on different scenes. Currently, the camera provided on the mobile terminal cannot intelligently control the exposure parameters based on different scenes.

SUMMARY

This application provides an exposure control method and an electronic device, to resolve a problem that an electronic device cannot intelligently control exposure parameters based on different scenes.

To achieve the foregoing objective, the following technical solutions are used in this application:

According to a first aspect, this application provides an exposure control method. The method may be applied to an electronic device having a photographing function, and the electronic device includes a photosensitive sensor. The method includes: separately determining a depth of field parameter, a movement level parameter, and a noise intensity factor, where the depth of field parameter is used to represent depth of field information of a viewfinder picture during photographing, the movement level parameter is used to represent a movement amplitude of a subject or a movement amplitude of the electronic device, and the noise intensity factor is used to represent noise intensity; determining exposure parameters based on the depth of field parameter, the movement level parameter, and the noise intensity factor, where the exposure parameters include an aperture value, an exposure time value, and light sensitivity of the photosensitive sensor; and controlling an aperture size, a shutter speed, and light sensitivity that are of the electronic device during photographing previewing and/or photographing based on the exposure parameters.

By using the foregoing technical solution, the electronic device can comprehensively evaluate and determine an exposure scene during photographing based on the depth of field information of the viewfinder picture, a relative movement between the electronic device and the subject, and the noise intensity, so that relatively accurate exposure parameters can be obtained based on different exposure scenes for photographing, and a shot photo can have fewer noises, less motion blur, and a clearer subject.

In a possible implementation, the electronic device further includes a motion sensor and a depth sensor; and the separately determining a depth of field parameter, a movement level parameter, and a noise intensity factor includes: respectively detecting movement of the subject and movement or vibration of the electronic device based on an optical flow method and the motion sensor to obtain the movement level parameter; obtaining the depth of field parameter based on phase detection depth data of the photosensitive sensor and depth data detected by the depth sensor; and obtaining the noise intensity factor based on scene brightness and a brightness gain during photographing, where the brightness gain is a gain for brightening a dark part when the electronic device performs photographing.

In this way, motion of the subject and motion of the electronic device can be respectively detected by using the optical flow method and the motion sensor, so that the electronic device can intelligently control the aperture value even when the electronic device vibrates or shakes, thereby reducing a motion blur phenomenon. The noise intensity factor is determined based on both the scene brightness and the brightness gain, so that the noise intensity can be more comprehensively accurately determined. The depth data is separately detected by using the depth sensor and phase detection of the photosensitive sensor, so that a finally obtained depth of field parameter can be more accurate.

In another possible implementation, the respectively detecting movement of the subject and movement or vibration of the electronic device based on an optical flow method and the motion sensor to obtain the movement level parameter includes: determining, based on the optical flow method, a first movement parameter used to represent the movement amplitude of the subject; determining, based on the motion sensor, a second movement parameter used to represent the movement amplitude of the electronic device; and determining the movement level parameter based on the first movement parameter and the second movement parameter.

The motion of the subject and the motion of the electronic device are respectively detected by using the optical flow method and the motion sensor to obtain corresponding movement parameters, and a final movement level parameter is determined based on the two movement parameters, so that accuracy of comprehensive evaluation of the movement of the electronic device and the movement of the subject can be improved.

In another possible implementation, the determining the movement level parameter based on the first movement parameter and the second movement parameter includes: separately normalizing the first movement parameter and the second movement parameter; and determining a larger value of a normalized first movement parameter and a normalized second movement parameter as the movement level parameter.

In this way, this can facilitate subsequent use of a larger one of the movement amplitude of the electronic device and the movement amplitude of the subject as a reference to adjust the exposure parameter, thereby minimizing a motion blur phenomenon.

In another possible implementation, the determining the movement level parameter based on the first movement parameter and the second movement parameter includes: separately normalizing the first movement parameter and the second movement parameter; determining a larger value of a normalized first movement parameter and a normalized second movement parameter as a to-be-determined movement level parameter; and filtering the to-be-determined movement level parameter, and using the to-be-determined movement level parameter as the movement level parameter when a filtering condition is satisfied, where the filtering condition includes: a value of the to-be-determined movement level parameter is greater than a first preset threshold, and/or a difference between the value of the to-be-determined movement level parameter and an average value of to-be-determined movement level parameters previously determined in time domain is less than a second preset threshold.

In this way, this can prevent an obtained movement level parameter from being too small and greatly fluctuating, thereby improving accuracy of an exposure parameter finally determined based on the movement level parameter.

In another possible implementation, the depth data includes a depth value corresponding to each pixel of the viewfinder picture, and the obtaining the depth of field parameter based on phase detection depth data of the photosensitive sensor and depth data detected by the depth sensor includes: determining a first standard deviation based on the phase detection depth data, where the first standard deviation is a standard deviation of a set of a depth value corresponding to each pixel in the phase detection depth data; determining a second standard deviation based on the depth data detected by the depth sensor, where the second standard deviation is a standard deviation of a set of a depth value corresponding to each pixel in the depth data detected by the depth sensor; determining whether an area percentage of a pixel corresponding to a maximum depth value in the depth data detected by the depth sensor is greater than a third preset threshold; and if yes, determining the first standard deviation as the depth of field parameter; or if not, determining the second standard deviation as the depth of field parameter.

Because the depth data detected by the depth sensor is more accurate, the depth data detected by the depth sensor can be used as a reference to determine the depth of field parameter. When the area percentage of the pixel corresponding to the maximum depth value is small, it indicates that accuracy of the depth data detected by the depth sensor is low. In this case, the depth of field parameter is determined based on the phase detection depth data, so that accuracy of the determined depth of field parameter can be improved.

In another possible implementation, the obtaining the noise intensity factor based on scene brightness and a brightness gain during photographing includes: querying a first lookup table based on the scene brightness to obtain a corresponding first noise factor, where the first noise factor is used to represent noise intensity introduced by the scene brightness, and the first lookup table includes a correspondence between scene brightness and a first noise factor; querying a second lookup table based on the brightness gain to obtain a corresponding second noise factor, where the second noise factor is used to represent noise intensity introduced by the brightness gain, and the second lookup table includes a correspondence between brightness gain and a second noise factor; and performing weighted summation on the first noise factor and the second noise factor to obtain the noise intensity factor.

In this way, noises respectively introduced by the scene brightness and the brightness gain can be comprehensively considered, so that an obtained noise intensity factor can be more accurate.

In another possible implementation, the performing weighted summation on the first noise factor and the second noise factor to obtain the noise intensity factor includes: performing weighted summation on the first noise factor and the second noise factor to obtain a to-be-determined noise intensity factor; and filtering the to-be-determined noise intensity factor, and using the to-be-determined noise intensity factor as the noise intensity factor when a filtering condition is satisfied, where the filtering condition includes: a difference between a value of the to-be-determined noise intensity factor and an average value of to-be-determined noise intensity factors previously determined in time domain is less than a fourth preset threshold.

In this way, this can prevent a value of an obtained noise intensity factor from greatly fluctuating, thereby improving accuracy of an exposure parameter finally determined based on the noise intensity factor.

In another possible implementation, the determining exposure parameters based on the depth of field parameter, the movement level parameter, and the noise intensity factor includes: querying a third lookup table based on the depth of field parameter to determine the aperture value, where the third lookup table includes a correspondence between a depth of field parameter and an aperture value; determining a total exposure volume according to an automatic exposure algorithm; determining a remaining exposure volume based on the total exposure volume and the aperture value; querying an exposure table based on the remaining exposure volume to determine a corresponding initial exposure time value; querying a fourth lookup table based on the movement level parameter to obtain a corresponding first parameter, where the fourth lookup table includes a correspondence between a movement level parameter and a first parameter; querying a fifth lookup table based on the noise intensity factor to obtain a corresponding second parameter, where the fifth lookup table includes a correspondence between a noise intensity factor and a second parameter; determining the exposure time value based on the initial exposure time value, the first parameter, and the second parameter; and determining the light sensitivity based on the remaining exposure volume and the exposure time value.

In this way, initial light sensitivity and the initial exposure time value can be adjusted based on the noise intensity factor and the movement level parameter, so that finally obtained light sensitivity and a finally obtained exposure time value can take into account impact of the noise and the relative movement between the subject and the electronic device, and finally a motion blur phenomenon in an obtained photo can be reduced and the noise can be reduced.

According to a second aspect, an embodiment of this application provides an exposure control apparatus, where the apparatus may be applied to an electronic device to implement the method according to the first aspect. A function of the apparatus may be implemented by using hardware, or may be implemented by executing corresponding software by hardware. The hardware or the software includes one or more modules corresponding to the foregoing function, for example, a motion detection module, a depth of field detection module, a noise intensity factor detection module, an exposure parameter calculation module, and a control module.

The depth of field detection module is configured to determine a depth of field parameter, the motion detection module is configured to determine a movement level parameter, and the noise intensity factor detection module is configured to determine a noise intensity factor. The depth of field parameter is used to represent depth of field information of a viewfinder picture during photographing, the movement level parameter is used to represent a movement amplitude of a subject or a movement amplitude of the electronic device, and the noise intensity factor is used to represent noise intensity. The exposure parameter calculation module is configured to determine exposure parameters based on the depth of field parameter, the movement level parameter, and the noise intensity factor, and the exposure parameters include an aperture value, an exposure time value, and light sensitivity of a photosensitive sensor. The control module is configured to control an aperture size, a shutter speed, and light sensitivity that are of the electronic device during photographing previewing and/or photographing based on the exposure parameters.

In a possible implementation, the electronic device further includes a motion sensor and a depth sensor. The motion detection module is specifically configured to respectively detect movement of the subject and movement or vibration of the electronic device based on an optical flow method and the motion sensor to obtain the movement level parameter. The depth of field detection module is specifically configured to obtain the depth of field parameter based on phase detection depth data of the photosensitive sensor and depth data detected by the depth sensor. The noise intensity factor detection module is specifically configured to obtain the noise intensity factor based on scene brightness and a brightness gain during photographing, and the brightness gain is a gain for brightening a dark part when the electronic device performs photographing.

In another possible implementation, the motion detection module is specifically configured to: determine, based on the optical flow method, a first movement parameter used to represent the movement amplitude of the subject; determine, based on the motion sensor, a second movement parameter used to represent the movement amplitude of the electronic device; and determine the movement level parameter based on the first movement parameter and the second movement parameter.

In another possible implementation, the motion detection module is specifically configured to separately normalize the first movement parameter and the second movement parameter; and determine a larger value of a normalized first movement parameter and a normalized second movement parameter as the movement level parameter.

In another possible implementation, the motion detection module is specifically configured to: separately normalize the first movement parameter and the second movement parameter; determine a larger value of a normalized first movement parameter and a normalized second movement parameter as a to-be-determined movement level parameter; and filter the to-be-determined movement level parameter, and use the to-be-determined movement level parameter as the movement level parameter when a filtering condition is satisfied, where the filtering condition includes: a value of the to-be-determined movement level parameter is greater than a first preset threshold, and/or a difference between the value of the to-be-determined movement level parameter and an average value of to-be-determined movement level parameters previously determined in time domain is less than a second preset threshold.

In another possible implementation, the depth data includes a depth value corresponding to each pixel of the viewfinder picture, and the depth of field detection module is specifically configured to: determine a first standard deviation based on the phase detection depth data, where the first standard deviation is a standard deviation of a set of a depth value corresponding to each pixel in the phase detection depth data; determine a second standard deviation based on the depth data detected by the depth sensor, where the second standard deviation is a standard deviation of a set of a depth value corresponding to each pixel in the depth data detected by the depth sensor; determine whether an area percentage of a pixel corresponding to a maximum depth value in the depth data detected by the depth sensor is greater than a third preset threshold; and if yes, determine the first standard deviation as the depth of field parameter; or if not, determine the second standard deviation as the depth of field parameter.

In another possible implementation, the noise intensity factor detection module is specifically configured to: query a first lookup table based on the scene brightness to obtain a corresponding first noise factor, where the first noise factor is used to represent noise intensity introduced by the scene brightness, and the first lookup table includes a correspondence between scene brightness and a first noise factor; query a second lookup table based on the brightness gain to obtain a corresponding second noise factor, where the second noise factor is used to represent noise intensity introduced by the brightness gain, and the second lookup table includes a correspondence between brightness gain and a second noise factor; and perform weighted summation on the first noise factor and the second noise factor to obtain the noise intensity factor.

In another possible implementation, the noise intensity factor detection module is specifically configured to perform weighted summation on the first noise factor and the second noise factor to obtain a to-be-determined noise intensity factor; and filter the to-be-determined noise intensity factor, and use the to-be-determined noise intensity factor as the noise intensity factor when a filtering condition is satisfied, where the filtering condition includes: a difference between a value of the to-be-determined noise intensity factor and an average value of to-be-determined noise intensity factors previously determined in time domain is less than a fourth preset threshold.

In another possible implementation, the exposure parameter calculation module is specifically configured to: query a third lookup table based on the depth of field parameter to determine the aperture value, where the third lookup table includes a correspondence between a depth of field parameter and an aperture value; determine a total exposure volume according to an automatic exposure algorithm; determine a remaining exposure volume based on the total exposure volume and the aperture value; query an exposure table based on the remaining exposure volume to determine a corresponding initial exposure time value; query a fourth lookup table based on the movement level parameter to obtain a corresponding first parameter, where the fourth lookup table includes a correspondence between a movement level parameter and a first parameter; query a fifth lookup table based on the noise intensity factor to obtain a corresponding second parameter, where the fifth lookup table includes a correspondence between a noise intensity factor and a second parameter; determine the exposure time value based on the initial exposure time value, the first parameter, and the second parameter; and determine the light sensitivity based on the remaining exposure volume and the exposure time value.

According to a third aspect, an embodiment of this application provides an electronic device, including a processor and a memory configured to store instructions executable by the processor. When the processor is configured to execute the instructions, the electronic device is enabled to implement the exposure control method according to any one of the first aspect or the possible implementations of the first aspect.

According to a fourth aspect, an embodiment of this application provides a computer-readable storage medium, where the computer-readable storage medium stores computer program instructions. When the computer program instructions are executed by an electronic device, the electronic device is enabled to implement the exposure control method according to any one of the first aspect or the possible implementations of the first aspect.

According to a fifth aspect, an embodiment of this application provides a computer program product, including computer-readable code. When the computer-readable code is run on an electronic device, the electronic device is enabled to implement the exposure control method according to any one of the first aspect or the possible implementations of the first aspect.

It should be understood that, for beneficial effects of the second aspect to the fifth aspect, refer to related descriptions in the first aspect. Details are not described herein again.

DESCRIPTION OF EMBODIMENTS

Figure 1:
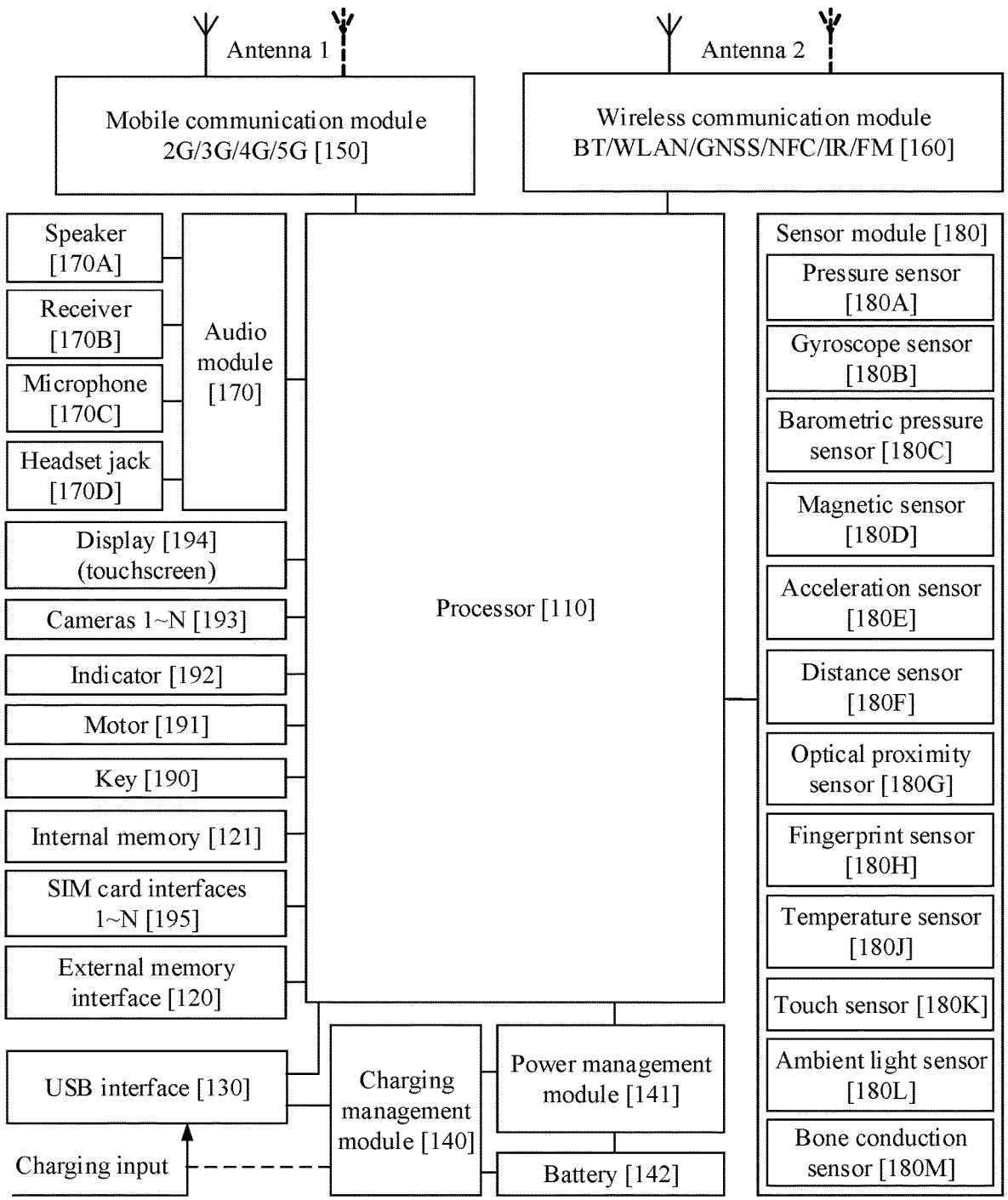
FIG. 1 is a schematic diagram of a structure of an electronic device according to an embodiment of this application.

With development of mobile terminals such as a mobile phone and a tablet computer, a quantity of mobile terminals around people is increasing, and people more frequently use the mobile terminals.

Currently, to meet a photographing requirement of a user, many mobile terminals are provided with cameras, so that the user can use the mobile terminal for photographing conveniently and quickly. Quality of camera photographing mainly depends on whether exposure parameters used by the camera during photographing are appropriate. The exposure parameters usually include an exposure time value, an aperture value, and light sensitivity (ISO) of a photosensitive sensor. Different exposure parameters have different impact on an effect of camera photographing. For example, a longer exposure time corresponding to the exposure time value indicates a more serious phenomenon of motion blur in a photo shot by the camera. Higher light sensitivity of the photosensitive sensor indicates more noises in a photo shot by the camera, that is, a lower signal-to-noise ratio. A larger aperture indicates a shallower depth of field in a photo shot by the camera, that is, a more blurred background in the photo.

Therefore, when the camera is used for photographing in different scenes, the exposure parameters need to be controlled based on the different scenes, so that the shot photo can have fewer noises, less motion blur, and a clearer subject. Currently, the camera provided on the mobile terminal cannot intelligently control the exposure parameters based on different scenes.

To resolve the foregoing problem, an embodiment of this application provides an exposure control method. The method may be applied to an electronic device having a photographing function, so that the electronic device can accurately control an exposure parameter based on a current scene.

The exposure control method provided in this embodiment of this application may be as follows: When the electronic device prepares for photographing, the electronic device may separately determine a depth of field parameter used to represent depth of field information of a viewfinder picture during photographing, a movement level parameter used to represent a movement amplitude of a subject or a movement amplitude of the electronic device, and a noise intensity factor used to represent noise intensity; then, obtain three exposure parameters: an aperture value, an exposure time value, and light sensitivity of a photosensitive sensor based on the depth of field parameter, the movement level parameter, and the noise intensity factor; and then control an aperture size, a shutter speed, and light sensitivity of the photosensitive sensor that are of the electronic device during photographing based on the obtained three exposure parameters, so that a photo shot by the electronic device can have relatively accurate exposure.

In this way, the electronic device can comprehensively evaluate and determine an exposure scene during photographing based on the depth of field information of the viewfinder picture, a relative movement between the electronic device and the subject, and the noise intensity, so that relatively accurate exposure parameters can be obtained based on different exposure scenes for photographing, and the shot photo can have fewer noises, less motion blur, and a clearer subject.

With reference to the accompanying drawings, the following describes the exposure control method provided in this embodiment of this application.

In an embodiment of this application, an electronic device having a photographing function may be a mobile phone, a tablet computer, a handheld computer, a PC, a cellular phone, a personal digital assistant (PDA), a wearable device (for example, a smartwatch or a smart band), a smart home device (for example, a television), an in-vehicle infotainment (for example, a vehicle-mounted computer), a smart screen, a game console, a camera, an augmented reality (AR)/virtual reality (VR) device, or the like. A specific device form of the electronic device is not specially limited in this embodiment of this application.

For example, the electronic device is a mobile phone. FIG. 1 is a schematic diagram of a structure of an electronic device according to an embodiment of this application. That is, for example, the electronic device shown in FIG. 1 may be a mobile phone.

As shown in FIG. 1, the electronic device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the schematic structure in this embodiment does not constitute a specific limitation on the electronic device. In some other embodiments, the electronic device may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device. The controller may generate an operation control signal based on instruction operation code and a timing signal, to complete control of instruction fetching and instruction execution.

A memory may be further disposed in the processor 110, and is configured to store instructions and data. In some embodiments the memory in processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI) interface, a general-purpose input/output (GPIO) interface, a subscriber identity module (SIM) interface, and/or a universal serial bus (USB) interface, and the like.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send a processed electromagnetic wave to the modem processor for demodulation. The mobile communication module 150 may further amplify a signal obtained after modulation by the modem processor, and convert the signal into an electromagnetic wave for radiation by using the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a wireless communication solution applied to the electronic device, including a wireless local area network (WLAN) (for example, a wireless fidelity (Wi-Fi network), Bluetooth (BT), a global navigation satellite system (GNSS), frequency modulation (FM), near field communication (NFC), or an infrared (IR) technology. The wireless communication module 160 may be one or more components integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 and the mobile communication module 150 in the electronic device are coupled, and the antenna 2 and the wireless communication module 160 are coupled, so that the electronic device can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a beidou navigation satellite system (BDS), a quasi-zenith satellite system (QZSS), and/or a satellite based augmentation system (SBAS).

The electronic device implements a display function through the GPU, the display 194, the application processor, and the like. The GPU is a microprocessor for image processing and is connected to the display 194 and the application processor. The GPU is configured to perform mathematical and geometrical calculation, and is configured to render a graphic. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a Miniled, a MicroLed, a Micro-oLed, a quantum dot light emitting diode (QLED), or the like. In some embodiments, the electronic device may include one or N displays 194, where N is a positive integer greater than 1.

The electronic device may implement a photographing function by using the ISP, the camera 193 (that is, a lens, usually including a photosensitive sensor and a lens group), the video codec, the GPU, the display 194, the application processor, and the like. In some embodiments, the electronic device may include one or N cameras 193, where N is a positive integer greater than 1. For example, in this embodiment of this application, the electronic device may include three cameras: a main camera lens, a long focus lens, and an ultra wide angle lens, or the electronic device may include only a main camera lens. Optionally, the electronic device may further include a depth camera or a depth sensor to perform depth detection on a viewfinder picture during photographing.

The internal memory 121 may be configured to store computer executable program code, and the executable program code includes instructions. The processor 110 runs the instructions stored in the internal memory 121, to perform various functional applications and data processing of the electronic device. The internal memory 121 may include a program storage area and a data storage area. The program storage area may store an operating system, an application required by at least one function (for example, a sound playback function or an image playback function), and the like. The data storage area may store data (for example, audio data and a phone book) and the like created during use of the electronic device. In addition, the internal memory 121 may include a high-speed random access memory, and may further include a non-volatile memory, for example, at least one magnetic disk storage device, a flash memory device, or a universal flash storage (UFS).

Certainly, it can be understood that FIG. 1 is merely an example for description when a form of the electronic device is a mobile phone. If the electronic device is a tablet computer, a handheld computer, a PC, a PDA, a wearable device (for example, a smartwatch or a smart band), a smart home device (for example, a television), an in-vehicle infotainment (for example, an in-vehicle computer), a smart screen, a game console, a camera, an AR/VR device, or in another device form, the electronic device may include fewer structures than those shown in FIG. 1, or may include more structures than those shown in FIG. 1, which is not limited herein.

The method in the following embodiment may be implemented by an electronic device having the foregoing hardware structure.

Figure 2:
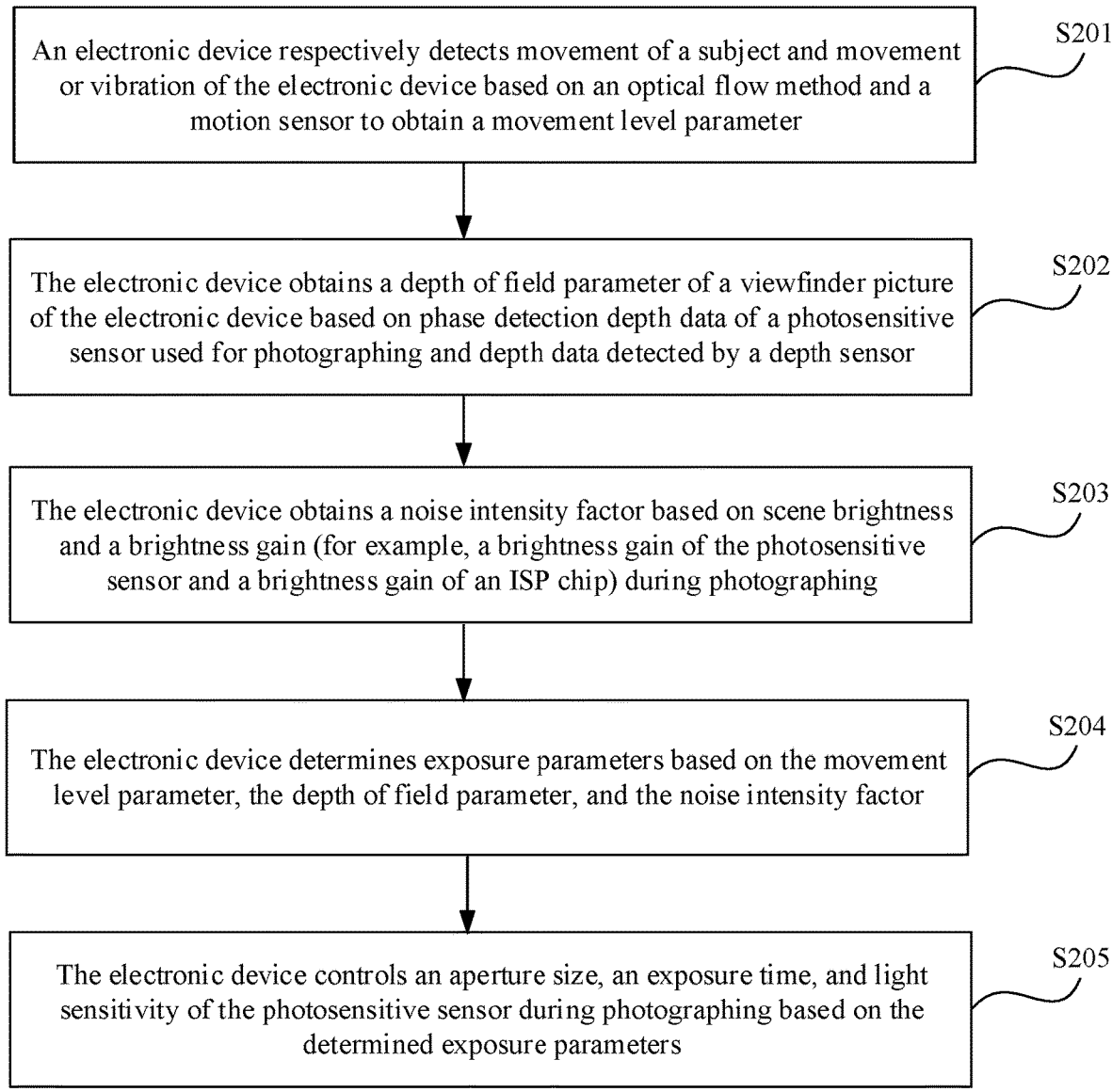
FIG. 2 is a schematic flowchart of an exposure control method according to an embodiment of this application.

For example, the electronic device is a mobile phone. FIG. 2 is a schematic flowchart of an exposure control method according to an embodiment of this application. As shown in FIG. 2, the exposure control method may include S201-S205.

S201: The electronic device respectively detects movement of a subject and movement or vibration of the electronic device based on an optical flow method and a motion sensor to obtain a movement level parameter.

Optionally, the electronic device may detect motion of the subject based on the optical flow method to obtain a first movement parameter (which may be used to represent a movement amplitude of the subject); detect the movement or the vibration of the electronic device by using the motion sensor (for example, a gyroscope sensor) to obtain a second movement parameter (which may be used to represent a movement amplitude of the electronic device); and then obtain the movement level parameter based on the first movement parameter and the second movement parameter.

The optical flow (Optical flow or optic flow) method is a concept about object motion detection in a field of vision, and is used to describe motion of an observed object, surface, or edge relative to motion of an observer. The optical flow method is very useful in pattern recognition, computer vision, and a field of other image processing, and can be used for motion detection. Therefore, the movement of the subject can be detected by using a correlation algorithm of the optical flow method to obtain a first movement parameter.

For example, that the electronic device detects the movement or the vibration of the electronic device by using the motion sensor to obtain a second movement parameter may be that: the electronic device calculates the second movement parameter based on a displacement amount (x, y, z) that is of the electronic device in a spatial coordinate system and that is detected by the motion sensor. For example, the second movement parameter may be calculated according to the following formula:

$$M = \left(x^2 + y^2 + z^2\right)^{0.5},$$

where

M is the second movement parameter; x is displacement that is of the electronic device on an X-axis and that is detected by the motion sensor; y is displacement that is of the electronic device on a Y-axis and that is detected by the motion sensor; and z is displacement that is of the electronic device on a Z-axis and that is detected by the motion sensor.

Figure 3:
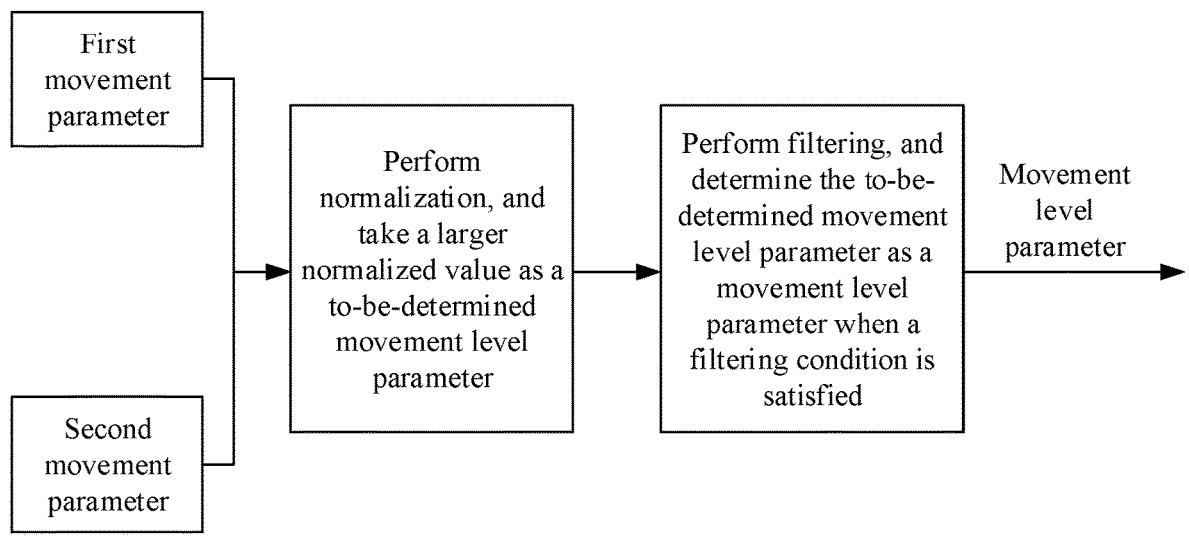
FIG. 3 is a schematic flowchart of determining a movement level parameter in an exposure control method according to an embodiment of this application.

As an example, a manner of obtaining the movement level parameter based on the first movement parameter and the second movement parameter may be shown in FIG. 3. When separately obtaining the first movement parameter and the second movement parameter, the electronic device may first separately normalize the first movement parameter and the second movement parameter, and take a larger value obtained after normalization as a to-be-determined movement level parameter. Normalizing the first movement parameter and the second movement parameter can make the first movement parameter and the second movement parameter at a same magnitude for comparison. Then, the determined to-be-determined movement level parameter may be directly used as a final movement level parameter, that is, a larger value of a normalized first movement parameter and a normalized second movement parameter may be directly used as the movement level parameter. Optionally, the electronic device may further filter the determined larger value, that is, the to-be-determined movement level parameter, to finally determine the to-be-determined movement level parameter as the final movement level parameter when the determined to-be-determined movement level parameter satisfies a filtering condition. For example, the filtering condition may be as follows: A value of the determined to-be-determined movement level parameter is greater than a first preset threshold, and/or a difference between the value of the to-be-determined movement level parameter and an average value of to-be-determined movement level parameters previously determined in time domain is less than a second preset threshold. Based on this filtering condition, this can prevent a value of the finally determined movement level parameter from being too small or changing too much compared with a value of the previously determined movement level parameter, thereby preventing an exposure parameter finally determined based on the movement level parameter from being inaccurate.

S202: The electronic device obtains a depth of field parameter of a viewfinder picture of the electronic device based on phase detection (PD) depth data of a photosensitive sensor used for photographing and depth data detected by a depth sensor.

It should be noted that the viewfinder picture usually is a picture that can be received by the photosensitive sensor when the electronic device performs photographing, that is, a picture displayed in a viewfinder frame displayed by the electronic device.

In a related art, the electronic device usually performs phase detection by using the photosensitive sensor during photographing, to implement phase automatic focusing. When the photosensitive sensor performs phase detection, phase detection data is obtained, and depth calculation is performed based on the phase detection data to obtain depth data of the viewfinder picture (usually, the depth data includes a depth value corresponding to each pixel of the viewfinder picture).

Optionally, the depth sensor may be a TOF sensor or the like. The TOF sensor is used as an example. The TOF sensor may perform depth detection based on a time-of-flight of detected light from emission to reception to calculate depth data of the viewfinder picture (usually, the depth data includes a depth value corresponding to each pixel of the viewfinder picture).

Figure 4:
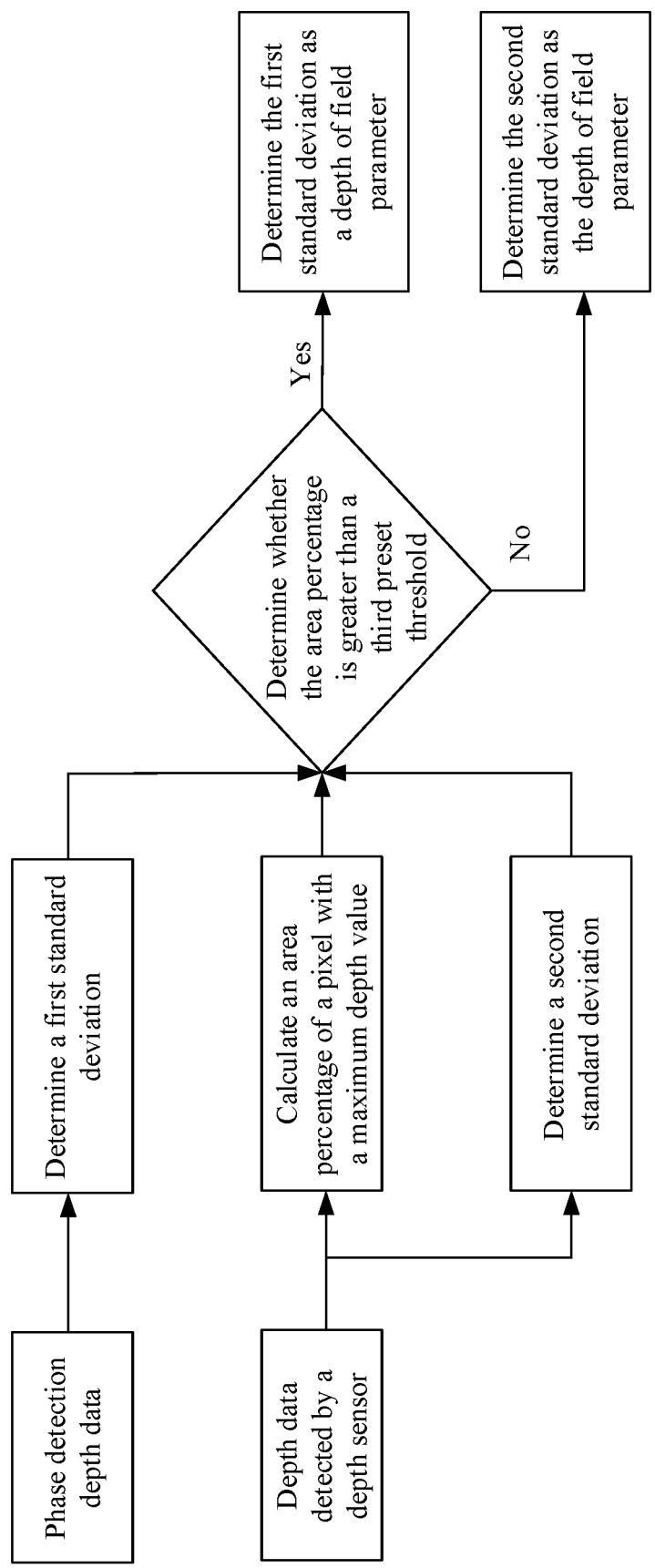
FIG. 4 is a schematic flowchart of determining a depth of field parameter in an exposure control method according to an embodiment of this application.

As an example, a manner of obtaining depth of field information of the viewfinder picture of the electronic device based on the phase detection (PD) depth data of the photosensitive sensor used for photographing and the depth data detected by the depth sensor may be shown in FIG. 4. When separately obtaining the phase detection depth data and the depth data detected by the depth sensor, the electronic device may calculate a first standard deviation of a set of a depth value corresponding to each pixel in the phase detection depth data. The electronic device calculates a second standard deviation of a set of a depth value corresponding to each pixel in the depth data detected by the depth sensor. The electronic device may further calculate an area percentage of a pixel corresponding to a maximum depth value in the depth data detected by the depth sensor. Then, the electronic device determines whether the area percentage is greater than a third preset threshold. If yes, it indicates that the depth data detected by the depth sensor is inaccurate, and therefore the first standard deviation (that is, the first standard deviation of the set of the depth value corresponding to each pixel in the phase detection depth data) is used as the depth of field parameter. If not, it indicates that the depth data detected by the depth sensor is relatively accurate, and therefore the second standard deviation (that is, the second standard deviation of the set of the depth value corresponding to each pixel in the depth data detected by the depth sensor) can be used as the depth of field parameter.

S203: The electronic device obtains a noise intensity factor based on scene brightness and a brightness gain (for example, a brightness gain of the photosensitive sensor and a brightness gain of an ISP chip) during photographing.

Usually, in the related art, the electronic device measures light of the subject during photographing to obtain the scene brightness. For example, the electronic device may calculate the scene brightness based on 3A statistics (that is, an automatic exposure 86933AE) statistic, an auto focus (AF) statistic, and an automatic white balance (AWB) statistic) and an AE parameter by using a scene brightness algorithm in the related art.

When the electronic device performs photographing, the photosensitive sensor further performs gain processing on a collected optical signal, and an ISP further performs gain processing on brightness of a shot photo, to brighten a dark part. Therefore, the electronic device can calculate a gain of the photosensitive sensor and a gain of the ISP based on an algorithm in the related art to obtain the brightness gains of the photosensitive sensor and the ISP for the photo.

Figure 5:
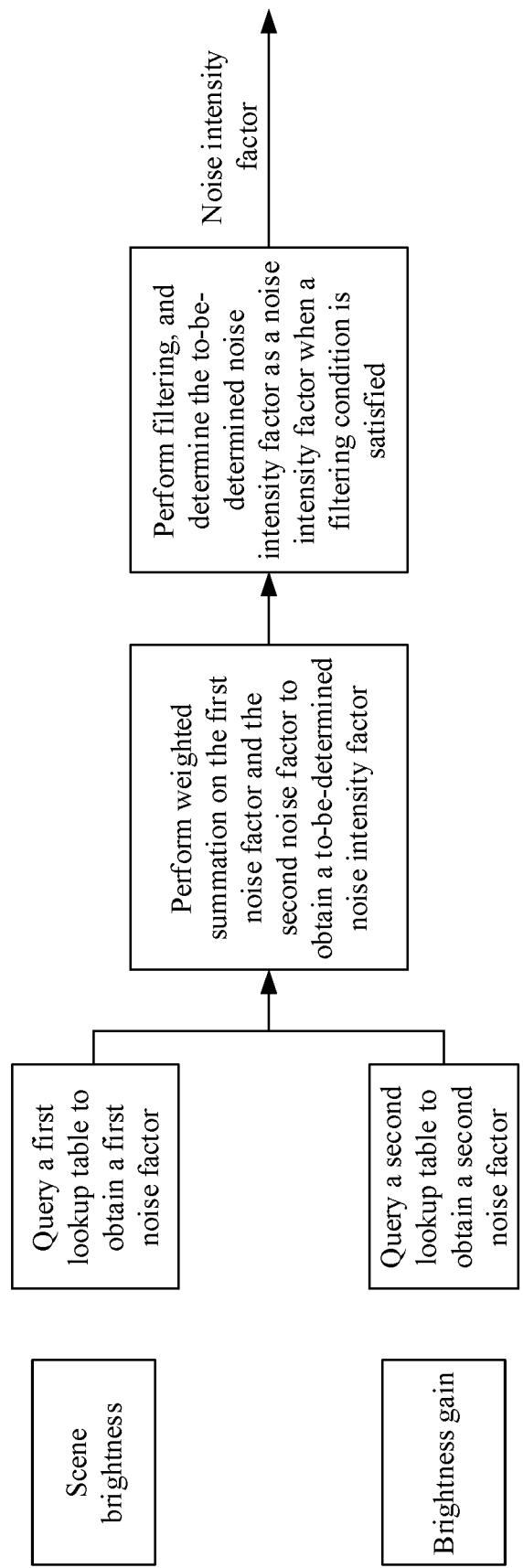
FIG. 5 is a schematic flowchart of determining a noise intensity factor in an exposure control method according to an embodiment of this application.

As an example, a manner of obtaining the noise intensity factor based on the scene brightness and the brightness gain (for example, the brightness gain of the photosensitive sensor and the brightness gain of the ISP chip) during photographing may be shown in FIG. 5. When separately obtaining the scene brightness and the brightness gain, the electronic device may query a first lookup table (LUT1) based on the scene brightness to obtain a corresponding first noise factor (which may be used to represent noise intensity introduced by the scene brightness). The electronic device may further query a second lookup table (LUT2) based on the brightness gain to obtain a corresponding second noise factor (which may be used to represent noise intensity introduced by the brightness gain). Therefore, the noise intensity factor can be determined based on the first noise factor and the second noise factor. For example, weighted summation (where a weighted weight is not limited and may be set based on a test situation) may be performed on the first noise factor and the second noise factor to obtain the noise intensity factor. For another example, weighted summation may be first performed on the first noise factor and the second noise factor to obtain a to-be-determined noise intensity factor, and the to-be-determined noise intensity factor is then filtered to finally determine the to-be-determined noise intensity factor as the noise intensity factor when the to-be-determined noise intensity factor satisfies a filtering condition. For example, the filtering condition may be as follows: A difference between a value of the determined to-be-determined noise intensity factor and an average value of to-be-determined noise intensity factors previously determined in time domain is less than a fourth preset threshold. Based on this filtering condition, this can prevent a value of the final determined noise intensity factor from changing too much compared with that of the previously determined noise intensity factor, thereby preventing an exposure parameter finally determined based on the noise intensity factor from being inaccurate.

The first lookup table includes first noise factors corresponding to different scene brightness. The first lookup table may be preset based on test debugging. Usually, darker scene brightness indicates a greater noise. Therefore, the scene brightness in the first lookup table can be inversely proportional to the first noise factor. The second lookup table includes second noise factors corresponding to different brightness gains. The second lookup table may be preset based on test debugging. Usually, a greater brightness gain indicates a greater noise. Therefore, the brightness gain in the second lookup table can be proportional to the second noise factor.

S204: The electronic device determines exposure parameters based on the movement level parameter, the depth of field parameter, and the noise intensity factor.

The exposure parameters may include an aperture value (AV), an exposure time value (TV), and light sensitivity (ISO).

Figure 6:
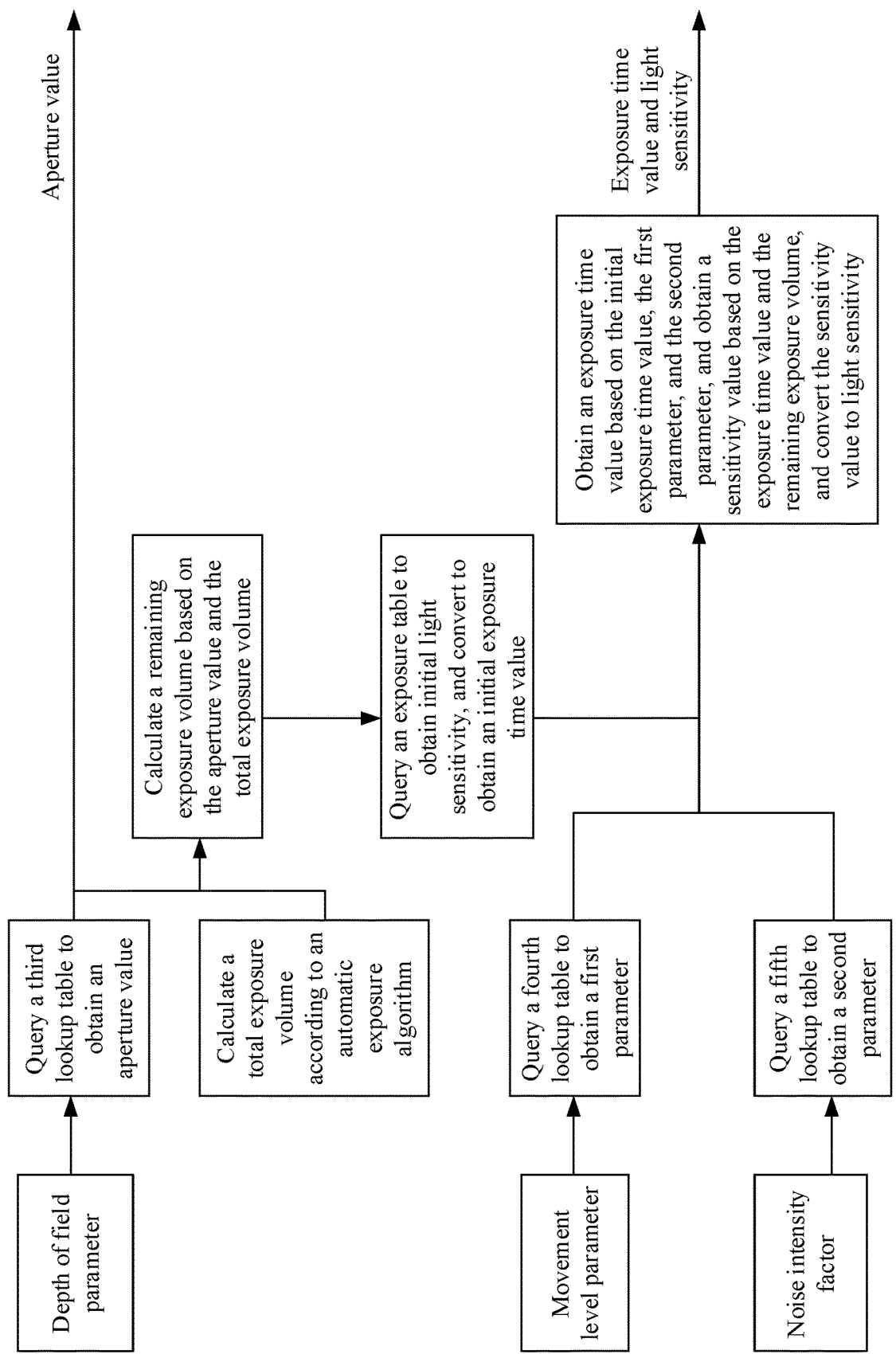
FIG. 6 is a schematic flowchart of determining exposure parameters in an exposure control method according to an embodiment of this application.

Optionally, as shown in FIG. 6, a manner in which the electronic device determines the exposure parameter may be querying a third lookup table (LUT3) based on the depth of field parameter to obtain a corresponding aperture value (AV). A total exposure volume (TotalEV) is then determined based on an automatic exposure algorithm. Therefore, a remaining exposure volume (RemainEV) that needs to be compensated by the exposure time value and the light sensitivity can be determined based on the total exposure volume and the aperture value, that is, RemainEV=TotalEV-AV. When the remaining exposure volume is determined, it is possible to query an exposure table based on the remaining exposure volume to determine corresponding initial light sensitivity, thereby facilitating obtaining of a corresponding initial exposure time value ($TV_0$) based on the determined initial light sensitivity in an exposure parameter manner in the related art. Accordingly, the electronic device may further query a fourth lookup table (LUT4) based on the movement level parameter to obtain a corresponding first parameter ($shift_1$), and query a fifth lookup table (LUT5) based on the noise intensity factor to obtain a corresponding second parameter ($shift_2$). Therefore, a final exposure time value (TV) can be subsequently obtained based on the foregoing obtained initial exposure time value ($TV_0$), the first parameter ($shift_1$), and the second parameter ($shift_2$). For example, the exposure time value may be obtained according to a formula: $TV=TV_0+shift_1+shift_2$. Accordingly, a sensitivity value (sensitivity value, SV) may be determined based on the obtained exposure time value (TV) and the foregoing determined remaining exposure volume (RemainEV). For example, the sensitivity value may be obtained according to a formula: SV=RemainEV-TV. Then, light sensitivity (ISO) corresponding to the sensitivity value may be obtained according to a conversion formula (that is, a conversion formula of an SV in an exposure parameter equation: $SV=\log_2(0.3 S)$, where S is the light sensitivity).

The third lookup table includes aperture values corresponding to different depth of field parameters, and the third lookup table may be preset based on test debugging. The fourth lookup table includes first parameters corresponding to different movement level parameters, and the fourth lookup table may be preset based on test debugging. The fifth lookup table includes second parameters corresponding to different noise intensity factors, and the fifth lookup table may be preset based on test debugging. The exposure table includes initial light sensitivity corresponding to different remaining exposure volumes, and the exposure table may be preset based on test debugging.

Optionally, the exposure table may be directly queried based on the remaining exposure volume to determine the corresponding initial exposure time value. In this case, the exposure table may include initial exposure time values corresponding to different remaining exposure volumes, and the exposure table may be preset based on test debugging.

A larger movement level parameter indicates a larger amplitude of relative movement between the electronic device and the subject, and the relative movement between the electronic device and the subject easily causes motion blur. Therefore, the motion blur can be alleviated by reducing the exposure time. According to a conversion formula of a TV in the exposure parameter equation: $TV=\log_2(1/T)$, where T is an exposure time, and a larger exposure time value indicates a shorter exposure time. Therefore, based on the foregoing formula for calculating the exposure time value, a larger movement level parameter indicates a larger corresponding first parameter.

A larger noise intensity factor indicates a greater noise, and the light sensitivity and a sensitivity value corresponding to the light sensitivity usually have great impact on a noise. Therefore, a signal-to-noise ratio can be increased by reducing the sensitivity value, that is, reducing the light sensitivity corresponding to the sensitivity value. Therefore, according to the foregoing formula for calculating the sensitivity value, the sensitivity value can be reduced by increasing the exposure time value. With reference to the formula for calculating the exposure time value, the second parameter may be a positive value, and a larger noise intensity factor indicates a larger corresponding second parameter.

S205: The electronic device controls an aperture size, an exposure time, and light sensitivity of the photosensitive sensor during photographing based on the determined exposure parameters.

After determining the exposure parameters, the electronic device may control the aperture size during photographing based on the aperture value in the exposure parameters, so that a finally obtained photo can have an appropriate depth of field, thereby preventing the subject from undergoing bokeh. The electronic device may further adjust the exposure time of the electronic device during photographing based on the exposure time value in the exposure parameters, for example, may control a shutter opening time (that is, a shutter speed) during photographing based on the exposure time value. Therefore, a shot photo can be exposed for an appropriate time based on the amplitude of the relative movement between the subject and the electronic device, and a motion blur phenomenon of the subject in the obtained photo due to motion can be reduced. The electronic device may further control the photosensitive sensor of the electronic device based on the light sensitivity in the exposure parameters, that is, control the photosensitive sensor to perform photographing with the light sensitivity.

Optionally, in this embodiment of this application, after determining the exposure parameters and before performing photographing, the electronic device may further control an aperture size, an exposure time, and light sensitivity during photographing previewing based on the exposure parameters, so that a user can preview an effect of a finally obtained photo based on a preview picture.

Optionally, in some other possible embodiments, before performing photographing, the electronic device may further determine, based on the scene brightness, the light sensitivity, and the noise intensity factor obtained in the foregoing steps, whether a noise is large, thereby determining whether to use a multi-frame noise reduction photo mode or a single-frame photo mode during photographing.

For example, because a noise of the finally obtained photo is large when the scene brightness is dark, the light sensitivity is high, or the noise intensity factor is large, a corresponding threshold can be respectively set corresponding to the scene brightness, the light sensitivity, and the noise intensity factor. Then, when the scene brightness is less than the corresponding threshold, and/or when at least one of the light sensitivity and the noise intensity factor is greater than the corresponding threshold, it is determined that the noise is large, thereby determining that the multi-frame noise reduction photo mode is used during photographing. Otherwise, the single-frame photo mode is used.

It should be noted that an execution sequence of S201-S203 in the above steps is not limited in this embodiment of this application, provided that the depth of field parameter, the movement level parameter, and the noise intensity factor can be obtained according to S201-S203.

Figure 7:
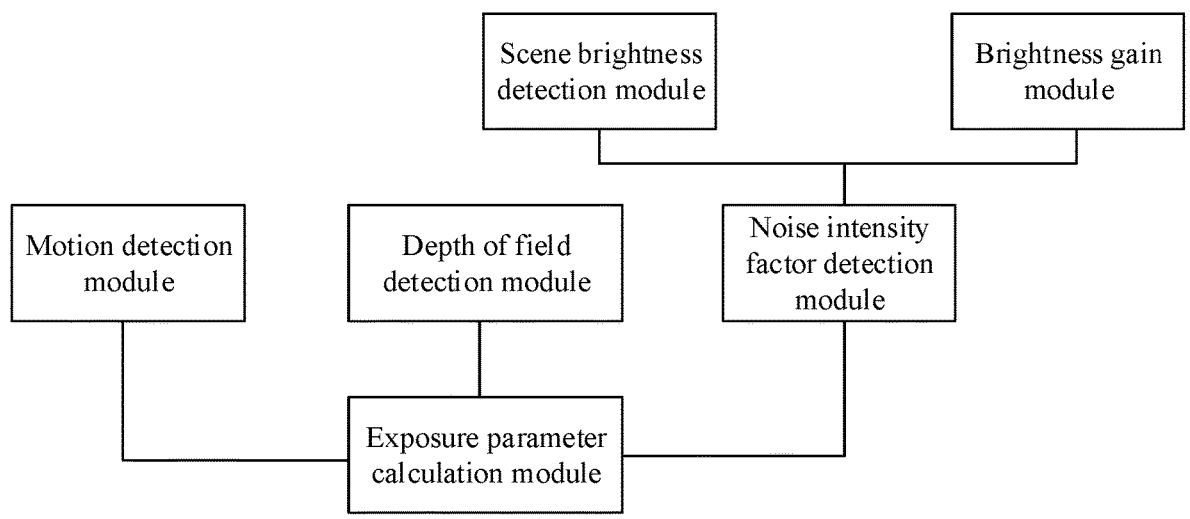
FIG. 7 is a schematic diagram of a software architecture of an electronic device according to an embodiment of this application.

In an embodiment of this application, based on the foregoing method, FIG. 7 is a schematic diagram of a software architecture of an electronic device according to an embodiment of this application. As shown in FIG. 7, the software architecture may include a motion detection module, a depth of field detection module, a noise intensity factor detection module, a scene brightness detection module, a brightness gain module, an exposure parameter calculation module, and the like.

The motion detection module may detect relative movement between a subject and an electronic device to obtain a movement level parameter (for a specific implementation, refer to S201). The depth of field detection module may detect depth data of a viewfinder picture to obtain a depth of field parameter (for a specific implementation, refer to S202). The scene brightness detection module may detect and obtain scene brightness, and the brightness gain module may calculate and determine a brightness gain. Therefore, the noise intensity factor detection module obtains a noise intensity factor based on the scene brightness and the brightness gain (for a specific implementation, refer to S203). The exposure parameter calculation module may calculate and determine exposure parameters based on the obtained movement level parameter, the obtained depth of field parameter, and the obtained noise intensity factor (for a specific implementation, refer to S204). Therefore, an aperture, an exposure time, and light sensitivity during previewing can be controlled based on the exposure parameters. An aperture, an exposure time, and light sensitivity during photographing can also be controlled based on the exposure parameters.

According to the method in the foregoing embodiment, the electronic device can comprehensively evaluate and determine an exposure scene during photographing based on depth of field information of the viewfinder picture, the relative movement between the electronic device and the subject, and noise intensity, so that relatively accurate exposure parameters can be obtained based on different exposure scenes for photographing, and a shot photo can have fewer noises, less motion blur, and a clearer subject.

Corresponding to the method in the foregoing embodiment, an embodiment of this application further provides an exposure control apparatus. The apparatus may be applied to the foregoing electronic device to implement the method in the foregoing embodiment. A function of the apparatus may be implemented by using hardware, or may be implemented by executing corresponding software by hardware. The hardware or the software includes one or more modules corresponding to the foregoing function. For example, the apparatus includes a motion detection module, a depth of field detection module, a noise intensity factor detection module, an exposure parameter calculation module, a control module, and the like, which can cooperate to implement the related method in the foregoing embodiment.

For example, the depth of field detection module is configured to determine a depth of field parameter, the motion detection module is configured to determine a movement level parameter, and the noise intensity factor detection module is configured to determine a noise intensity factor. The depth of field parameter is used to represent depth of field information of a viewfinder picture during photographing, the movement level parameter is used to represent a movement amplitude of a subject or a movement amplitude of the electronic device, and the noise intensity factor is used to represent noise intensity. The exposure parameter calculation module is configured to determine exposure parameters based on the depth of field parameter, the movement level parameter, and the noise intensity factor, and the exposure parameters include an aperture value, an exposure time value, and light sensitivity of a photosensitive sensor. The control module is configured to control an aperture size, a shutter speed, and light sensitivity that are of the electronic device during photographing previewing and/or photographing based on the exposure parameters.

In a possible implementation, the electronic device further includes a motion sensor and a depth sensor. The motion detection module is specifically configured to respectively detect movement of the subject and movement or vibration of the electronic device based on an optical flow method and the motion sensor to obtain the movement level parameter. The depth of field detection module is specifically configured to obtain the depth of field parameter based on phase detection depth data of the photosensitive sensor and depth data detected by the depth sensor. The noise intensity factor detection module is specifically configured to obtain the noise intensity factor based on scene brightness and a brightness gain during photographing, and the brightness gain is a gain for brightening a dark part when the electronic device performs photographing.

In another possible implementation, the motion detection module is specifically configured to: determine, based on the optical flow method, a first movement parameter used to represent the movement amplitude of the subject; determine, based on the motion sensor, a second movement parameter used to represent the movement amplitude of the electronic device; and determine the movement level parameter based on the first movement parameter and the second movement parameter.

In another possible implementation, the motion detection module is specifically configured to separately normalize the first movement parameter and the second movement parameter; and determine a larger value of a normalized first movement parameter and a normalized second movement parameter as the movement level parameter.

In another possible implementation, the motion detection module is specifically configured to: separately normalize the first movement parameter and the second movement parameter; determine a larger value of a normalized first movement parameter and a normalized second movement parameter as a to-be-determined movement level parameter; and filter the to-be-determined movement level parameter, and use the to-be-determined movement level parameter as the movement level parameter when a filtering condition is satisfied, where the filtering condition includes: a value of the to-be-determined movement level parameter is greater than a first preset threshold, and/or a difference between the value of the to-be-determined movement level parameter and an average value of to-be-determined movement level parameters previously determined in time domain is less than a second preset threshold.

In another possible implementation, the depth data includes a depth value corresponding to each pixel of the viewfinder picture, and the depth of field detection module is specifically configured to: determine a first standard deviation based on the phase detection depth data, where the first standard deviation is a standard deviation of a set of a depth value corresponding to each pixel in the phase detection depth data; determine a second standard deviation based on the depth data detected by the depth sensor, where the second standard deviation is a standard deviation of a set of a depth value corresponding to each pixel in the depth data detected by the depth sensor; determine whether an area percentage of a pixel corresponding to a maximum depth value in the depth data detected by the depth sensor is greater than a third preset threshold; and if yes, determine the first standard deviation as the depth of field parameter; or if not, determine the second standard deviation as the depth of field parameter.

In another possible implementation, the noise intensity factor detection module is specifically configured to: query a first lookup table based on the scene brightness to obtain a corresponding first noise factor, where the first noise factor is used to represent noise intensity introduced by the scene brightness, and the first lookup table includes a correspondence between scene brightness and a first noise factor; query a second lookup table based on the brightness gain to obtain a corresponding second noise factor, where the second noise factor is used to represent noise intensity introduced by the brightness gain, and the second lookup table includes a correspondence between brightness gain and a second noise factor; and perform weighted summation on the first noise factor and the second noise factor to obtain the noise intensity factor.

In another possible implementation, the noise intensity factor detection module is specifically configured to perform weighted summation on the first noise factor and the second noise factor to obtain a to-be-determined noise intensity factor; and filter the to-be-determined noise intensity factor, and use the to-be-determined noise intensity factor as the noise intensity factor when a filtering condition is satisfied, where the filtering condition includes: a difference between a value of the to-be-determined noise intensity factor and an average value of to-be-determined noise intensity factors previously determined in time domain is less than a fourth preset threshold.

In another possible implementation, the exposure parameter calculation module is specifically configured to: query a third lookup table based on the depth of field parameter to determine the aperture value, where the third lookup table includes a correspondence between a depth of field parameter and an aperture value; determine a total exposure volume according to an automatic exposure algorithm; determine a remaining exposure volume based on the total exposure volume and the aperture value; query an exposure table based on the remaining exposure volume to determine a corresponding initial exposure time value; query a fourth lookup table based on the movement level parameter to obtain a corresponding first parameter, where the fourth lookup table includes a correspondence between a movement level parameter and a first parameter; query a fifth lookup table based on the noise intensity factor to obtain a corresponding second parameter, where the fifth lookup table includes a correspondence between a noise intensity factor and a second parameter; determine the exposure time value based on the initial exposure time value, the first parameter, and the second parameter; and determine the light sensitivity based on the remaining exposure volume and the exposure time value.

It should be understood that division of units or modules (referred to as units in the following) in the apparatus is merely logical function division. In an actual implementation, all or some of the units or modules may be integrated into one physical entity, or may be physically separated. In addition, the units in the apparatus may be all implemented in a form of software invoked by using a processing element, or may be all implemented in a form of hardware, or some units may be implemented in a form of software invoked by using a processing element, and some units are implemented in a form of hardware.

For example, the units may be separately disposed processing elements, or may be integrated into a chip in the apparatus for implementation. In addition, the units may be stored in a memory in a form of a program, and invoked by a processing element of the apparatus to implement a function of the unit. In addition, all or some of these units may be integrated together, or may be implemented independently. The processing element described herein may also be referred to as a processor, and may be an integrated circuit that has a signal processing capability. In an implementation process, the steps in the foregoing methods or the foregoing units may be implemented by using a hardware integrated logic circuit in a processor element, or may be implemented by software invoked by the processing element.

In one example, the units in the foregoing apparatus may be one or more integrated circuits configured to implement the foregoing methods, for example, one or more ASICs, one or more DSPs, one or more FPGAs, or a combination of at least two of these integrated circuit forms.

For another example, when the units in the apparatus may be implemented in a form of scheduling a program by using the processing element, the processing element may be a general-purpose processor, for example, a CPU or another processor that can invoke the program. For another example, the units may be integrated together and implemented in a form of a system-on-a-chip (system-on-a-chip, SOC).

In an implementation, the units that are in the foregoing apparatus and that implement corresponding steps in the foregoing methods may be implemented in a form of scheduling a program by using the processing element. For example, the apparatus may include a processing element and a storage element, and the processing element invokes a program stored in the storage element to perform the methods described in the foregoing method embodiments. The storage element may be a storage element that is on a same chip as the processing element, that is, an on-chip storage element.

In another implementation, the program used to perform the foregoing methods may be on a storage element that is on a different chip from the processing element, that is, an off-chip storage element. In this case, the processing element invokes or loads a program from the off-chip storage element onto the on-chip storage element, to invoke and perform the methods described in the foregoing method embodiments.

For example, an embodiment of this application may further provide an apparatus, for example, an electronic device. The electronic device may include a processor and a memory configured to store instructions executable by the processor. When the processor is configured to execute the foregoing instructions, the electronic device is enabled to implement the exposure control method implemented by the electronic device in the foregoing embodiment. The memory may be located inside the electronic device or may be located outside the electronic device. In addition, there are one or more processors.

In still another implementation, the units that are in the apparatus and that implement the steps in the foregoing methods may be configured as one or more processing elements, and these processing elements may be disposed on the corresponding electronic device described above. The processing elements herein may be integrated circuits, for example, one or more ASICs, one or more DSPs, one or more FPGAs, or a combination of these types of integrated circuits. These integrated circuits may be integrated together to form a chip.

For example, an embodiment of this application further provides a chip system, and the chip system may be applied to the foregoing electronic device. The chip system includes one or more interface circuits and one or more processors. The interface circuit and the processor are connected to each other by using a line. The processor receives and executes computer instructions from a memory of the electronic device by using the interface circuit, to implement the methods related to the electronic device in the foregoing method embodiments.

An embodiment of this application further provides a computer program product, including computer instructions that are run by an electronic device, for example, the foregoing electronic device.

Through the description of the foregoing implementations, a person skilled in the art may clearly understand that, for the purpose of convenient and brief description, only division of the foregoing functional modules is used as an example for description. In actual application, the functions may be allocated to and completed by different functional modules as required. That is, an internal structure of the apparatus is divided into different functional modules, to complete all or some of the functions described above.

In several embodiments provided in this application, it should be understood that the disclosed apparatus and method may be implemented in another manner. For example, the foregoing apparatus embodiment is merely an example. For example, division of the modules or the units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may be one or more physical units, that is, may be located in one place, or may be distributed in a plurality of different places. Some or all of the units may be selected based on actual requirements to achieve the objectives of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product, for example, a program. The software product is stored in a program product, for example, a computer-readable storage medium, including several instructions used to enable a device (which may be a single-chip microcomputer, a chip, or the like) or a processor (processor) to perform all or some of the steps of the methods described in the embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the exposure control method described in the foregoing method embodiment.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

What is claimed is:

1. An exposure control method, applied to an electronic device having a photographing function, wherein the electronic device comprises a photosensitive sensor, and the method comprises:
    separately determining a depth of field parameter, a movement level parameter, and a noise intensity factor, wherein the depth of field parameter is used to represent depth of field information of a viewfinder picture during photographing, the movement level parameter is used to represent a movement amplitude of a subject or a movement amplitude of the electronic device, and the noise intensity factor is used to represent noise intensity;
    determining exposure parameters based on the depth of field parameter, the movement level parameter, and the noise intensity factor, wherein the exposure parameters comprise an aperture value, an exposure time value, and light sensitivity of the photosensitive sensor; and
    controlling an aperture value, a shutter speed, and light sensitivity that are of the electronic device during photographing previewing and/or photographing based on the exposure parameters.

2. The method according to claim 1, wherein the electronic device further comprises a motion sensor and a depth sensor; and the separately determining a depth of field parameter, a movement level parameter, and a noise intensity factor comprises:
    respectively detecting movement of the subject and movement or vibration of the electronic device based on an optical flow method and the motion sensor to obtain the movement level parameter;
    obtaining the depth of field parameter based on phase detection depth data of the photosensitive sensor and depth data detected by the depth sensor; and
    obtaining the noise intensity factor based on scene brightness and a brightness gain during photographing, wherein the brightness gain is a gain for brightening a dark part when the electronic device performs photographing.

3. The method according to claim 2, wherein the respectively detecting movement of the subject and movement or vibration of the electronic device based on an optical flow method and the motion sensor to obtain the movement level parameter comprises:
determining, based on the optical flow method, a first movement parameter used to represent the movement amplitude of the subject;
determining, based on the motion sensor, a second movement parameter used to represent the movement amplitude of the electronic device; and
determining the movement level parameter based on the first movement parameter and the second movement parameter.

4. The method according to claim 3, wherein the determining the movement level parameter based on the first movement parameter and the second movement parameter comprises:
separately normalizing the first movement parameter and the second movement parameter; and
determining a larger value of a normalized first movement parameter and a normalized second movement parameter as the movement level parameter.

5. The method according to claim 3, wherein the determining the movement level parameter based on the first movement parameter and the second movement parameter comprises:
separately normalizing the first movement parameter and the second movement parameter;
determining a larger value of a normalized first movement parameter and a normalized second movement parameter as a to-be-determined movement level parameter; and
filtering the to-be-determined movement level parameter, and using the to-be-determined movement level parameter as the movement level parameter when a filtering condition is satisfied, wherein
the filtering condition comprises: a value of the to-be-determined movement level parameter is greater than a first preset threshold, and/or a difference between the value of the to-be-determined movement level parameter and an average value of to-be-determined movement level parameters previously determined in time domain is less than a second preset threshold.

6. The method according to claim 2, wherein the depth data comprises a depth value corresponding to each pixel of the viewfinder picture, and the obtaining the depth of field parameter based on phase detection depth data of the photosensitive sensor and depth data detected by the depth sensor comprises:
determining a first standard deviation based on the phase detection depth data, wherein the first standard deviation is a standard deviation of a set of a depth value corresponding to each pixel in the phase detection depth data;
determining a second standard deviation based on the depth data detected by the depth sensor, wherein the second standard deviation is a standard deviation of a set of a depth value corresponding to each pixel in the depth data detected by the depth sensor;
determining whether an area percentage of a pixel corresponding to a maximum depth value in the depth data detected by the depth sensor is greater than a third preset threshold; and if yes, determining the first standard deviation as the depth of field parameter; or
if not, determining the second standard deviation as the depth of field parameter.

7. The method according to claim 2, wherein the obtaining the noise intensity factor based on scene brightness and a brightness gain during photographing comprises:
querying a first lookup table based on the scene brightness to obtain a corresponding first noise factor, wherein the first noise factor is used to represent noise intensity introduced by the scene brightness, and the first lookup table comprises a correspondence between scene brightness and a first noise factor;
querying a second lookup table based on the brightness gain to obtain a corresponding second noise factor, wherein the second noise factor is used to represent noise intensity introduced by the brightness gain, and the second lookup table comprises a correspondence between brightness gain and a second noise factor; and
performing weighted summation on the first noise factor and the second noise factor to obtain the noise intensity factor.

8. The method according to claim 7, wherein the performing weighted summation on the first noise factor and the second noise factor to obtain the noise intensity factor comprises:
performing weighted summation on the first noise factor and the second noise factor to obtain a to-be-determined noise intensity factor; and
filtering the to-be-determined noise intensity factor, and using the to-be-determined noise intensity factor as the noise intensity factor when a filtering condition is satisfied, wherein
the filtering condition comprises: a difference between a value of the to-be-determined noise intensity factor and an average value of to-be-determined noise intensity factors previously determined in time domain is less than a fourth preset threshold.

9. The method according to claim 1, wherein the determining exposure parameters based on the depth of field parameter, the movement level parameter, and the noise intensity factor comprises:
querying a third lookup table based on the depth of field parameter to determine the aperture value, wherein the third lookup table comprises a correspondence between a depth of field parameter and an aperture value;
determining a total exposure volume according to an automatic exposure algorithm;
determining a remaining exposure volume based on the total exposure volume and the aperture value;
querying an exposure table based on the remaining exposure volume to determine a corresponding initial exposure time value;
querying a fourth lookup table based on the movement level parameter to obtain a corresponding first parameter, wherein the fourth lookup table comprises a correspondence between a movement level parameter and a first parameter;
querying a fifth lookup table based on the noise intensity factor to obtain a corresponding second parameter, wherein the fifth lookup table comprises a correspondence between a noise intensity factor and a second parameter;
determining the exposure time value based on the initial exposure time value, the first parameter, and the second parameter; and determining the light sensitivity based on the remaining exposure volume and the exposure time value.

10. An electronic device, comprising a processor and a memory configured to store instructions executable by the processor, wherein when the processor is configured to execute the instructions, the electronic device is enabled to implement the method according to claim 1.

11. A non-transitory computer-readable storage medium, wherein the computer-readable storage medium stores computer program instructions; and when the computer program instructions are executed by an electronic device, the electronic device is enabled to implement the method according to claim 1.

* * * * *